United States Patent
Chen et al.

(10) Patent No.: US 10,447,614 B2
(45) Date of Patent: Oct. 15, 2019

(54) PROVIDING HIGH AVAILABILITY FOR A THIN-PROVISIONED CONTAINER CLUSTER

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

(*) Notice: Subject to any disclaimer, the term of this patent is extended or adjusted under 35 U.S.C. 154(b) by 295 days.

(21) Appl. No.: 15/631,747

(22) Filed: Jun. 23, 2017

(65) Prior Publication Data

US 2018/0375787 A1 Dec. 27, 2018

(51) Int. Cl.
| | | |
|---|---|---|
| G06F 15/16 | (2006.01) | |
| H04L 12/917 | (2013.01) | |
| H04L 12/911 | (2013.01) | |
| G06F 9/48 | (2006.01) | |
| H04L 12/26 | (2006.01) | |
| G06F 9/50 | (2006.01) | |
| G06Q 20/14 | (2012.01) | |

(52) U.S. Cl.
CPC .......... *H04L 47/76* (2013.01); *G06F 9/4843* (2013.01); *G06F 9/5083* (2013.01); *H04L 43/0805* (2013.01); *H04L 47/823* (2013.01); *G06F 9/50* (2013.01); *G06Q 20/145* (2013.01)

(58) Field of Classification Search
CPC ... H04L 47/76; H04L 43/0805; H04L 47/823; G06F 9/4843; G06F 9/5083; G06F 9/50
See application file for complete search history.

(56) References Cited

U.S. PATENT DOCUMENTS

| 8,954,435 B2 | 2/2015 | Patwardhan et al. |
| 8,997,107 B2* | 3/2015 | Jain .......................... G06F 9/46 709/223 |
| 9,240,025 B1 | 1/2016 | Ward et al. |
| 9,294,236 B1 | 3/2016 | Ward, Jr. |

(Continued)

FOREIGN PATENT DOCUMENTS

WO    2016195703    12/2016

OTHER PUBLICATIONS

Google Cloud's Spot Instances Win Big and You Should Too, by Tino Tereshko; Big Data at Google. Helping Google drive adoption and direction of our Big Data tools.; Dec. 27, 2016 (5 pages).

(Continued)

*Primary Examiner* — Moustafa M Meky
(74) *Attorney, Agent, or Firm* — K&L Gates LLP

(57) ABSTRACT

A system and method for providing high availability for a thin-provisioned container cluster includes a memory, one or more processors in communication with the memory, a scheduler executing on the one or more processors, and a spot instance market monitor. The spot instance market monitor receives market information about spot instances in a cloud system at a first time. The spot instances are available to a client at the first time. The spot instance market monitor determines, based on the market information, a respective reliability value for each of the spot instances at the first time. Then, the scheduler selects one spot instance among the spot instances based on the reliability value of the spot instance. In response to the selection of the spot instance, the scheduler schedules a container on the spot instance and executes the container on the spot instance.

20 Claims, 8 Drawing Sheets

(56) References Cited

U.S. PATENT DOCUMENTS

| | | | |
|---|---|---|---|
| 9,508,095 B2* | 11/2016 | Stella | G06Q 30/0631 |
| 9,558,465 B1* | 1/2017 | Arguelles | G06Q 10/0639 |
| 9,870,310 B1* | 1/2018 | Arguelles | G06Q 10/0639 |
| 10,026,070 B2* | 7/2018 | Thorpe | H04L 47/823 |
| 2014/0229221 A1* | 8/2014 | Shih | G06Q 10/06313 |
| | | | 705/7.23 |
| 2015/0256481 A1 | 9/2015 | Turovsky et al. | |
| 2015/0363851 A1* | 12/2015 | Stella | G06Q 30/0631 |
| | | | 705/26.41 |
| 2016/0321115 A1* | 11/2016 | Thorpe | H04L 47/823 |
| 2016/0323377 A1 | 11/2016 | Einkauf et al. | |
| 2017/0116038 A1 | 4/2017 | Conover et al. | |
| 2017/0264659 A1* | 9/2017 | Raju | H04L 63/10 |
| 2018/0048536 A1* | 2/2018 | Ghodsi | H04L 41/5051 |

OTHER PUBLICATIONS

The Easiest Way to Leverage EC2 Spot Instances with Docker and Nirmata—DZone Cloud, by Jim Bugwadia, MVB; Nov. 13, 2015 (21 pages).

Powering your Amazon ECS Clusters with Spot Fleet—AWS Compute Blog, by Chris Barclay; Jan. 19, 2016; Amazon EC2, Amazon ECS (4 pages).

\* cited by examiner

PROVIDING HIGH AVAILABILITY FOR A THIN-PROVISIONED CONTAINER CLUSTER

BACKGROUND

A multi-tenant cloud provider typically hosts many virtual machines ("VMs") belonging to many different tenants, which in turn host many different applications, including applications further virtualized in containers. Isolated guests such as VMs and containers may allow a programmer to quickly scale the deployment of applications to the volume of traffic requesting the applications. Isolated guests may be deployed in a variety of hardware environments. There may be economies of scale in deploying hardware in a large scale. A cloud provider may rent or sell excess computing capacity on extra hardware deployed to, for example, achieve per unit cost savings on hardware, or for the express purpose of creating a revenue stream from such rentals. A programmer may hire one or more cloud providers to provide contingent space for situations where the programmer's applications may require extra compute capacity, becoming a tenant of the cloud provider. A tenant may flexibly launch copies of isolated guests to scale their applications and services in response to the ebb and flow of traffic. Typically, a container is significantly lighter in weight than a VM, and may be hosted in a VM, for example, in a container cluster, allowing for additional flexibility and scalability of deployment.

SUMMARY

The present disclosure provides a new and innovative system and methods to provide high availability for a thin-provisioned container cluster. In an example, a system includes a memory, one or more processors in communication with the memory, a scheduler executing on the one or more processors, and a spot instance market monitor. In an example, the spot instance market monitor receives market information about spot instances in a cloud system at a first time. The spot instances are available to a client at the first time. The spot instance market monitor determines, based on the market information, a respective reliability value of each of the spot instances at the first time. Each respective reliability value corresponds to a respective likelihood of a respective spot instance being terminated by a second time that is later than the first. Then, the scheduler selects a spot instance among the spot instances based on the reliability value of the spot instance. In response to the selection of the spot instance, the scheduler schedules a container on the spot instance and executes the container on the spot instance.

Additional features and advantages of the disclosed method and apparatus are described in, and will be apparent from, the following Detailed Description and the Figures.

DETAILED DESCRIPTION OF EXAMPLE EMBODIMENTS

Figure 1:
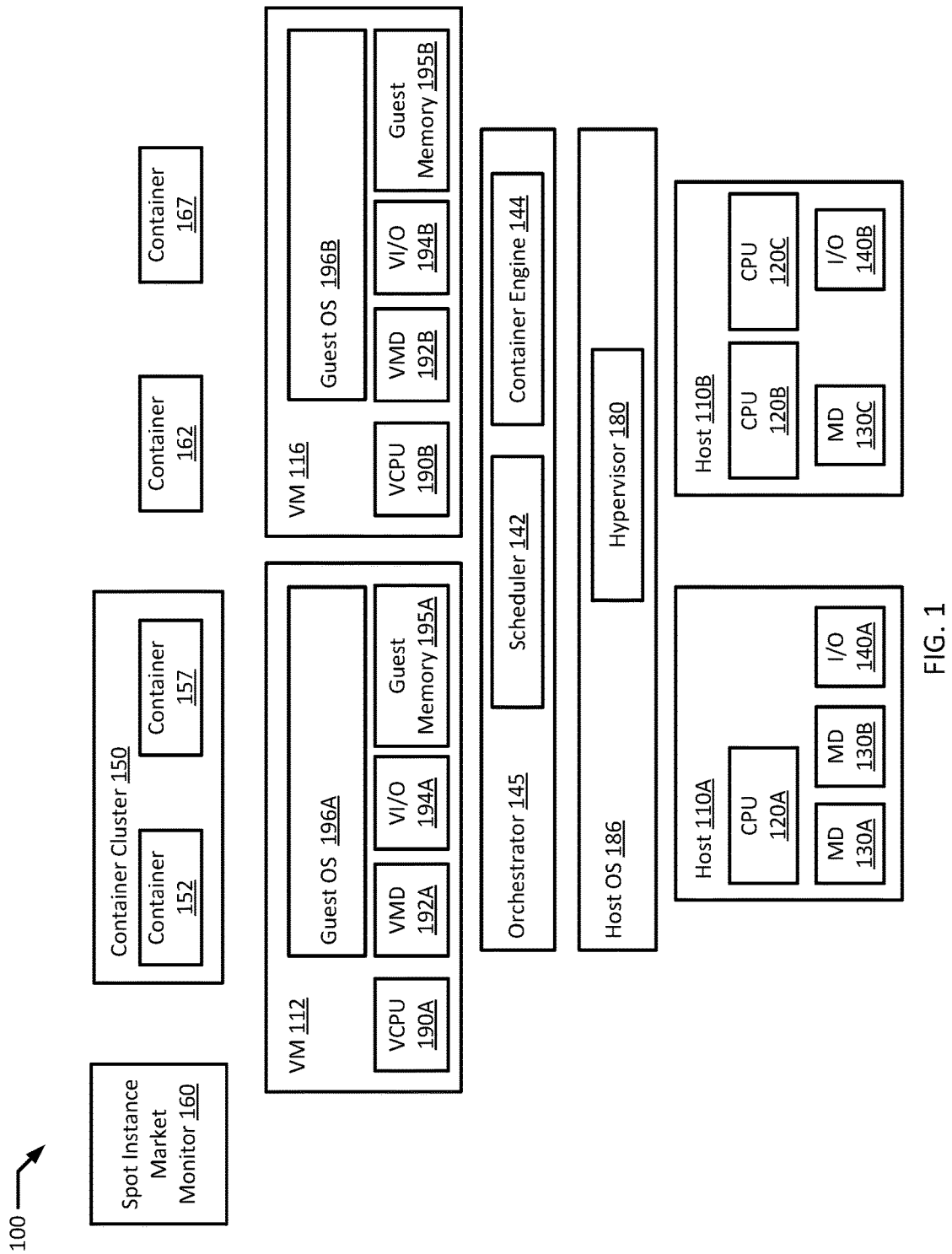
FIG. 1 is a block diagram of an example computer system according to an example of the present disclosure.

Described herein are methods and systems for providing high availability for a thin-provisioned container cluster. Generally, public cloud systems, such as Amazon Web Services™ (AWS™) or Google Cloud Platform™ (GCP™), offer multiple pricing options to clients of the systems. These pricing options may include reserved, on-demand, and spot instances. The reserved pricing option may allow a client to reserve an instance for a specified period (e.g., months or years) for a discounted price once the client makes an up-front payment for the specified period. The reserved pricing option is generally cheaper than the on-demand option.

The on-demand option allows a client to reserve computing resources by the hour with no long-term commitments or up-front payments on an on-demand basis (e.g., whenever a client needs additional computing capacity). This option may allow the client to pay for the hourly rate only for the instances used by the client. Generally, the on-demand instance service may not be interrupted by the service provider (e.g., AWS™, GCP™) while the on-demand instance is being used or reserved by the client.

Using the spot instance service (e.g., spot instances of AWS™, preempted instances of GCP™), a cloud client may purchase unused computer capacity (e.g., AWS EC2™ instance) of a public cloud system at a highly-reduced rate through a bidding process. For example, a client may specify a price per hour that the client is willing to pay for a spot instance, and if the spot instance becomes available at that price, the spot instance will be assigned to the client. The hourly price of a spot instance may change depending on the supply of and demand of the capacity (e.g., spot instances). The client may be able to reserve a spot instance on an on-demand basis as long as the client's bid exceeds the current market price. However, unlike the on-demand instance, the spot instance service can be interrupted by the service provider. For example, the spot instance reserved by a client may be terminated with short or even no notice if the spot instance is needed for use as an on-demand instance, or if the market price for the spot instance exceeds the client's bid price (e.g., when the demand for spot instances increases or when the supply of the spot instances decreases). The spot instances are usually much cheaper than on-demand instances (e.g., 70-90% less than on-demand instances).

Because of the low price, spot instances have been widely used for a stateless workload, such as development and testing projects where the interruption of service is acceptable. However, because of the interruptibility, spot instances are generally not used for a stateful workload, such as a production system (e.g., the execution of applications or web servers) or database services, where the interruption of service is not acceptable. Therefore, for stateful workloads, cloud system clients had to use either a reserved instance, by reserving the instance for a long term, or more expensive on-demand instances whenever the client needs additional computing capacity on an on-demand basis.

Aspects of the present disclosure may address the above-noted deficiencies. In an example, a spot instance market monitor may monitor a spot instance market and receive market information (e.g., the market price of spot instances, spot instance pricing history) about spot instances in a public cloud system. Then, the spot instance market monitor may determine, based on the market information, reliability values for each of the spot instances. The reliability value may decrease as the likelihood of a respective spot instance being terminated at a given time increases. In an example, the likelihood of a spot instance being terminated at a given time may increase over time (e.g., exponentially, geometrically, linearly) and, thus, the reliability value may also decrease over time. For example, if the reliability value of a new spot instance (e.g., just purchased or just assigned to the client) is 10 (maximum reliability), the reliability value of the spot instance may decrease over time (e.g., 5 hours later: 5; 10 hours later: 3; 15 hours later: 2).

In an example, a container scheduler may be configured to choose high reliable instances, among other factors, to dispatch containers. For example, the scheduler may select a spot instance among the available spot instances based on the reliability value of the spot instance (e.g., having the greatest reliability value among the available spot instances) and execute a container on that spot instance. If the reliability value of the spot instance on which the container is running becomes low (e.g., 2) at a later time, the scheduler may select another spot instance that is more reliable than the spot instance on which the container is running at the later time and migrate the container to this spot instance. In an example, the scheduler may start migrating the container from one spot instance to another spot instance, for example, when the reliability value of the spot instance on which the container was running becomes less than a predetermined reliability value (e.g., 3).

In case the spot instance on which the container was running is terminated before the migration, the scheduler may request the container to take a snapshot of the container periodically (e.g., every second, every minute, every 10 minutes, or every hour) and store the snapshot in a storage device. When detecting the termination of the first spot instance before migrating the container to another spot instance, the scheduler may pull the latest version of the snapshot of the container from the storage device and start executing the container on another spot instance (e.g., the spot instance having the greatest reliability value at that time) using the latest version of the snapshot of the container.

In this way, aspects of the present disclosure may enable a client of a cloud system to use a spot instance with fewer or no interruptions of the service. Even if the service is interrupted, the interrupted service can be recovered using the stored snapshots of the interrupted containers. Accordingly, aspects of the present disclosure may advantageously enable a client to use more cost-effective spot instances on an on-demand basis not only for stateless workloads, but also for stateful workloads, such as production systems (e.g., the execution of web applications) or database services. Enabling stateful workloads to execute on spot instances with increased reliability improves compute density on the public cloud system, saving a lot of the costs needed for using a public cloud system. Therefore, aspects of the present disclosure may enable powerful thin provisioning, where computing capacity is allocated on a just-enough and just-in-time basis, for both stateless and stateful workloads. Additional features and advantages of the disclosed method, system, and apparatus are described below.

FIG. 1 depicts a high-level component diagram of an example multi-processor computer system 100 in accordance with one or more aspects of the present disclosure. The system 100 may include one or more interconnected hosts 110A-B. Each host 110A-B may in turn include one or more physical processors (e.g., CPU 120A-C) communicatively coupled to memory devices (e.g., MD 130A-C) and input/output devices (e.g., I/O 140A-B). As used herein, physical processor or processors 120A-C refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In an example, a processor may be a single core processor that is typically capable of executing one instruction at a time (or processing a single pipeline of instructions), or a multi-core processor that may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device, the operation of which is based on the processor inputting and/or outputting binary data. Processors (Central Processing Units "CPUs") 120A-C may be interconnected using a variety of techniques, ranging from a point-to-point processor interconnect, to a system area network, such as an Ethernet-based network. Local connections within each host 110A-B, including the connections between a processor 120A and a memory device 130A-B and between a processor 120A and an I/O device 140A may be provided by one or more local buses of suitable architecture, for example, peripheral component interconnect (PCI).

In an example, hosts 110A-B may run one or more isolated guests, for example, containers 152, 157, 162, 167 and VMs 112 and 116. In an example, any of containers 152, 157, 162, and 167 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster (e.g., container cluster 150) that may be deployed together (e.g., in a Kubernetes® pod). In an example, a given service may require the deployment of multiple containers and/or pods in multiple physical locations. In an example, containers 152 and 157 may be part of container cluster 150, which may execute on VM 112. In an example, containers 162 and 167 may execute on VM 116. In an example, any of containers 152, 157, 162, and 167 may be executing directly on either of hosts 110A-B without a virtualized layer in between. In an example, orchestrator 145 may be a container orchestrator such as Kubernetes® or Docker Swarm®, which may execute directly on host operating system ("OS") 186. In another example, orchestrator 145 along with subcomponents scheduler 142 (e.g., Kubernetes® scheduler) and/or container engine 144 (e.g., Docker® engine) may execute on a separate host system, for example across a network from hosts 110A-B. In an example, orchestrator 145, scheduler 142, and container engine 144 may be applications that schedule, launch, and/or manage isolated guests (e.g., containers 152, 157, 162, 167 and VMs 112 and 116). In an example, isolated guests may be further nested in other isolated guests. For example VM 112 may host a container cluster 150 including containers 152 and 157, while VM 116 may host containers 162 and 167.

System 100 may run one or more VMs (e.g., VMs 112 and 116) by executing a software layer (e.g., hypervisor 180) above the hardware and below the VMs 112 and 116, as schematically shown in FIG. 1. In an example, the hypervisor 180 may be a component of the host operating system 186 executed by the system 100. In another example, the hypervisor 180 may be provided by an application running on the operating system 186, or may run directly on the hosts 110A-B without an operating system beneath it. The hypervisor 180 may virtualize the physical layer, including processors, memory, and I/O devices, and present this virtualization to VMs 112, 116 as devices, including virtual central processing units ("VCPUs") 190A-B, virtual memory devices ("VMDs") 192A-B, virtual input/output ("VI/O") devices 194A-B, and/or guest memories 195A-B. In an example, a container may execute directly on host OS 186 without an intervening layer of virtualization.

In an example, VMs 112, 116 may be a virtual machine and may execute guest operating systems 196A-B, which may utilize the underlying VCPU 190A-B, VMD 192A-B, and VI/O 194A-B. One or more containers that may host isolated guests (e.g., containers 152, 157, 162, and 167) may be running on VMs 112, 116 under the respective guest operating systems 196A-B. Processor virtualization may be implemented by the hypervisor 180 scheduling time slots on one or more physical processors 120A-C such that from the guest operating system's perspective those time slots are scheduled on a virtual processor 190A-B.

VMs 112, 116 may run on any type of dependent, independent, compatible, and/or incompatible applications on the underlying hardware and host operating system 186. In an example, containers 152 and 157 running on VM 112 may be dependent on the underlying hardware and/or host operating system 186. In another example, containers 152 and 157 running on VM 112 may be independent of the underlying hardware and/or host operating system 186. In an example, containers 152 and 157 running on VM 112 may be compatible with the underlying hardware and/or host operating system 186. Additionally, containers 152 and 157 running on VM 112 may be incompatible with the underlying hardware and/or OS. The hypervisor 180 may manage memory for the host operating system 186 as well as memory allocated to the VMs 112, 116 and guest operating systems 196A-B such as guest memory 195A-B provided to guest OS 196A-B.

In an example, containers 162 and 167 may be individual containers (e.g., not part of a cluster) executing on VM 116. In an example, container engine 144 may be a component part of a container orchestrator 145. In other examples, container engine 144 may be a stand-alone component. Similarly, scheduler 142 may be a standalone component. In some examples, container engine 144, scheduler 142, and hosts 110A-B may reside over a network from each other, which may be, for example, a public network (e.g., the Internet), a private network (e.g., a local area network (LAN) or wide area network (WAN)), or a combination thereof.

In an example, the system 100 may also include a spot instance market monitor 160. The spot instance market monitor 160 may be configured to receive market information about spot instances from a public cloud system (e.g., Amazon Web Services or Google Cloud Platform). The market information may include a spot instance pricing history. For example, the likelihood of certain types of spot instances (e.g., t2.large spot instances) being terminated at a given time may increase as a function of time (e.g., linearly, exponentially, geometrically.). The market information may also include a current or past market price (e.g., bidding price or purchased price) of each of the spot instances. In an example, the spot instance market monitor 160 may analyze a trend or a likelihood of the spot instances being terminated at a given time using the market information (e.g., the spot instance pricing history, past and current biding prices, supply and demand for spot instances).

In an example, the spot instance market monitor 160 may be a virtual device. For example, the spot instance market monitor 160 may be a virtual component (e.g., containers 152-167 or VMs 112-116) of the host machine 110A. In another example, the spot instance market monitor 160 may be separate from the host machines 110A-B. In an example, the spot instance market monitor 160 may be a physical device.

Figure 2:
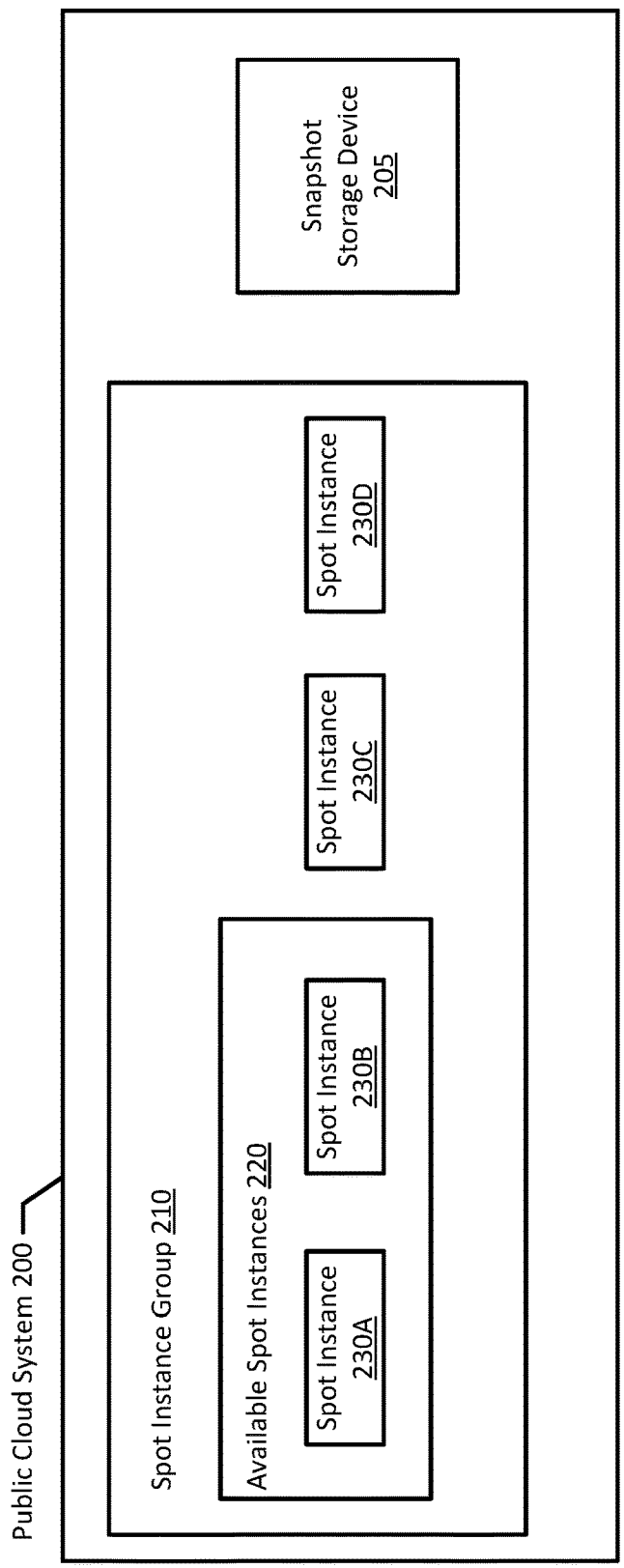
FIG. 2 is a block diagram of an example public cloud system according to an example of the present disclosure.

FIG. 2 shows a block diagram of an example public cloud system 200 according to an example of the present disclosure. The public cloud system 200 may include a snapshot storage device 205. The snapshot storage device 205 may store snapshots of containers, for example, running on spot instances. In an example, the snapshot storage device 205 may remove the oldest snapshot in the snapshot storage device 205 when the storage capacity exceeds a certain limit or a predetermined storage capacity (e.g., 10 GB, 100 GB). In an example, the snapshot storage device 205 may store one snapshot of each container at any given moment, and replace the snapshot in snapshot storage device 205 each time a new snapshot is captured. The public cloud system 200 may also include a spot instance group 210. The spot instance group 210 may include spot instances 230A-D. As used herein, a spot instance may refer to instances available under the spot instance pricing option provided by public cloud service providers (e.g., AWS™ or GCP™). Using the spot instance option, a cloud client may purchase unused instances at a highly reduced rate through a bidding process. For example, a client may specify a price per hour that the client is willing to pay for a spot instance (e.g., spot instances 230A-D) and, if the spot instance becomes available at that price, the spot instance will be assigned to the client. The hourly price of a spot instance may change depending on the supply of and demand of the spot instances. The spot instance may be reserved on an on-demand basis as long as the client's bid exceeds the current market price, but the spot instance reserved by the client may be terminated with short or even no notice if the market price for the spot instance exceeds the client's bid price (e.g., when the demand for spot instances increases or when the supply of the spot instances decreases).

Figure 3:
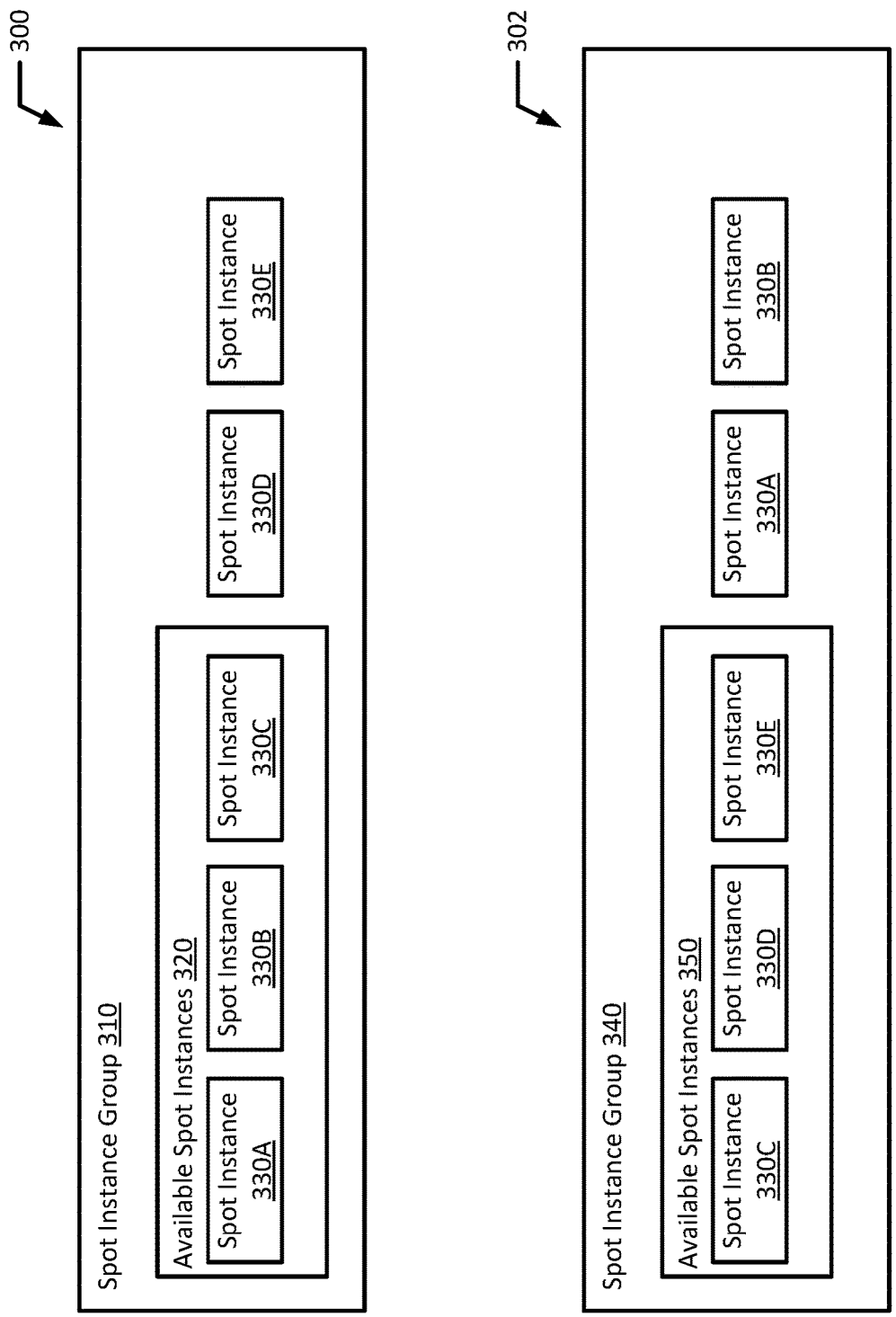
FIG. 3 is a block diagram of example spot instance groups at different times according to an example of the present disclosure.

FIG. 3 shows a block diagram of example spot instance groups 310, 340 at different times according to an example of the present disclosure. Block 300 shows a spot instance group 310 at a first time ($t_1$). The spot instance group 310 may include spot instances 330A-E. At $t_1$, spot instances 330A-C may be in the available spot instances 320. That is, spot instances 330A-C may be available to a client to the public cloud system at $t_1$. In an example, spot instances 330A-C may be available to the client since the spot instances 330A-C are assigned to or purchased by the client. At $t_1$, spot instances 330D-E may be assigned to or purchased by another client, so not available to the client.

Block 302 shows a spot instance group 340, which is the spot instance group 310 at a second time ($t_2$) after the first time ($t_1$). The spot instance group 340 may include spot instances 330A-E, but this time spot instances 330C-E may be in the available spot instances 350. That is, spot instances 330 C-E may be assigned to or purchased by the client and, thus, available to the client at $t_2$. At $t_2$, spot instances 330A-B may be assigned to or purchased by another client, so not available to the client.

Figure 4:
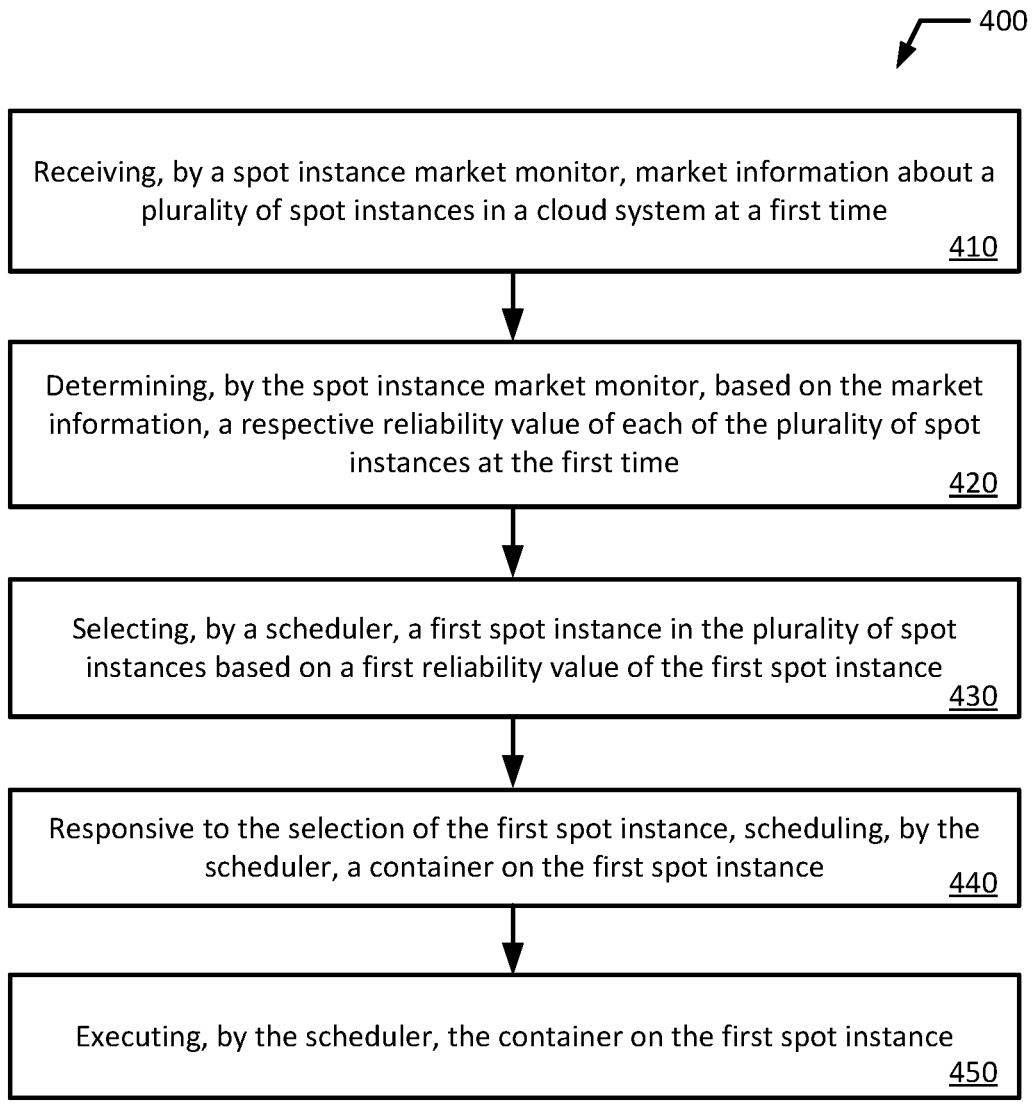
FIG. 4 is a flowchart illustrating an example process for providing high availability for a thin-provisioned container cluster according to an example of the present disclosure.

FIG. 4 shows a flowchart illustrating an example process for providing high availability for a thin-provisioned container cluster. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional.

In the illustrated example, a spot instance market monitor may receive market information about a plurality of spot instances in a cloud system at a first time (block 410). For example, a spot instance market monitor 160 may receive market information (e.g., 1 cent per hour for t2.small spot instances, 2 cents per hour for t2.large spot instances) about a plurality of spot instances 220 in a public cloud system 200 at 2 p.m. on June 1. The plurality of spot instances 220 may be available to a client at the first time. In an example, the cloud system may be a public or hybrid cloud system.

Then, the spot instance market monitor may determine, based on the market information, the respective reliability value of each of the plurality of spot instances at the first time (block 420). For example, the spot instance market monitor 160 may determine, based on the market information, a respective reliability value of each of the plurality of spot instances 220 at 2 p.m. on June 1. In an example, each respective reliability value may correspond to the likelihood of a respective spot instance being terminated by a second time after the first time. For example, each respective reliability value may correspond to a likelihood of a respective spot instance 230A-B being terminated by a certain time after 2 p.m. on June 1 (e.g., spot instance 230A's likelihood of termination within one hour: 20%; spot instance 230B's likelihood of termination within one hour: 90%). In an example, the respective reliability value decreases over time.

In an example, the market information may include information about a spot instance price history for the last couple of months (e.g., last three months). In an example, the likelihood of a respective spot instance 230A-B being terminated at a later time may increase over time (e.g., exponentially, linearly, geometrically). In an example, the higher the purchase price or the winning bid of a spot instance, the less likely a respective spot instance 230A-B is terminated at a given time. For example, assuming that spot instances 230A and 230B became available (e.g., purchased or assigned) to a client at the same time and spot instances 230A and 230B are the same type of spot instance (e.g., t2.small), spot instance 230A purchased at 2 cents per hour may less likely be terminated than spot instance 230B purchased at 1 cent per hour at a given time. That is, for example, if spot instance 230A purchased at 2 cents per hour has a likelihood of termination of 20% within 10 hours, spot instance 230B purchased at 1 cent per hour may have a likelihood of termination of 90% within 10 hours.

In an example, the reliability value of the spot instances at a given time may be between 10 (maximum reliability) and 0 (minimum reliability). As discussed above, each respective reliability value may correspond to a likelihood of a respective spot instance being terminated by a certain time. For example, if spot instance 230A has a likelihood of termination of 20% within one hour, spot instance 230A's reliability value may be 9, while the reliability value of spot instance 230B having a likelihood of termination of 90% within one hours may be 2. The spot instance market monitor 160 may determine the reliability value of the spot instances by using the age of each of the spot instances. For example, if the reliability value of a new spot instance (e.g., just purchased or just assigned to the client) is 10 (maximum reliability), as the spot instance gets older, the reliability value of the spot instance may also decrease (e.g., 1 hour later: 9; 4 hours later: 7; 10 hours later: 5). In an example, a spot instance may be considered a new spot instance from the moment the spot instance becomes available (e.g., purchased or assigned) to a client after the client made a bid for the spot instance and won the biding. In another example, a spot instance may be considered a new spot instance from any other suitable moment (e.g., from the moment of bidding, from the moment of winning the bidding, from the moment of becoming available in the market while not purchased/used by any clients, etc.).

In an example, the rate of the decrease of a spot instance's reliability value may be proportional to the change of the likelihood of the spot instance being terminated at a given time. For example, if the likelihood of a spot instance being terminated at a given time increases exponentially, the spot instance's reliability value may also decrease exponentially. In an example, the spot instance market monitor 160 may receive the market information and/or determine the respective reliability value of each of the first plurality of spot instances 220 periodically (e.g., every second, every 30 seconds, every minute, every 10 minutes, or every hour). In another example, the spot instance market monitor 160 may receive the market information and/or determine the respective reliability value of each of the first plurality of spot instances 220 randomly or in any other suitable manner. In an example, the spot instance market monitor 160 may receive the market information and/or determine the respective reliability value of each of the first plurality of spot instances 220 more frequently when the market or bidding price of the spot instances fluctuates with a relatively higher volatility level.

Then, a scheduler may select a first spot instance in the plurality of spot instances based on a first reliability value of the first spot instance (block 430). For example, a scheduler 142 executing on one or more processors 120A-C in communication with a memory 130A may select a first spot instance 230A in the plurality of spot instances 220 based on a first reliability value of the first spot instance 230A. For example, the first spot instance 230A may be selected because the first spot instance 230A may have the greatest reliability value among the first plurality of spot instances 220 at 2 p.m. on June 1. In an example, the scheduler 142 or the spot instance market monitor 160 may classify the spot instances available at a given time in a classification, such as a reliable classification and an unreliable classification based on the reliability values (e.g., 0≤reliability value<5: unreliable, 5≤reliability value≤10: reliable). In this case, the scheduler 142 may select any spot instance in the reliable classification at 2 p.m. on June 1.

In an example, the scheduler may also consider the purchase price in selecting a spot instance for the migration.

For example, if a client needs a spot instance for a short period of time (e.g., several minutes, several hours), the scheduler may select a spot instance whose purchase price is the lowest among the available spot instances whose reliability value is higher than a predetermined value (e.g., 8) at that time. If a client needs a spot instance for a longer period of time (e.g., for 10 hours, 20 hours, or more than a day), the scheduler may select a spot instance whose purchase price is in the mid-to-high price ranges among the available spot instances whose reliability value is higher than a predetermined value (e.g., 8) at that time.

In response to the selection of the first spot instance, the scheduler may schedule a container on the first spot instance (block 440). For example, in response to the selection of the first spot instance 230A, the scheduler 142 may schedule a container 152 on the first spot instance 230A. Then, the scheduler may execute the container on the first spot instance (block 450). For example, the scheduler 142 may execute the container 152 on the first spot instance 230A. In an example, the container 152 may include a payment processing service. In an example, the container 157 may include an instructional video service for the payment processing service, and the containers 152 and 157 in the same container cluster 150 may be launched together at the same time. In an example, the containers 152 and 157 in the container cluster 150 may be executed on the same spot instance (e.g., spot instance 230A).

Figure 5A:
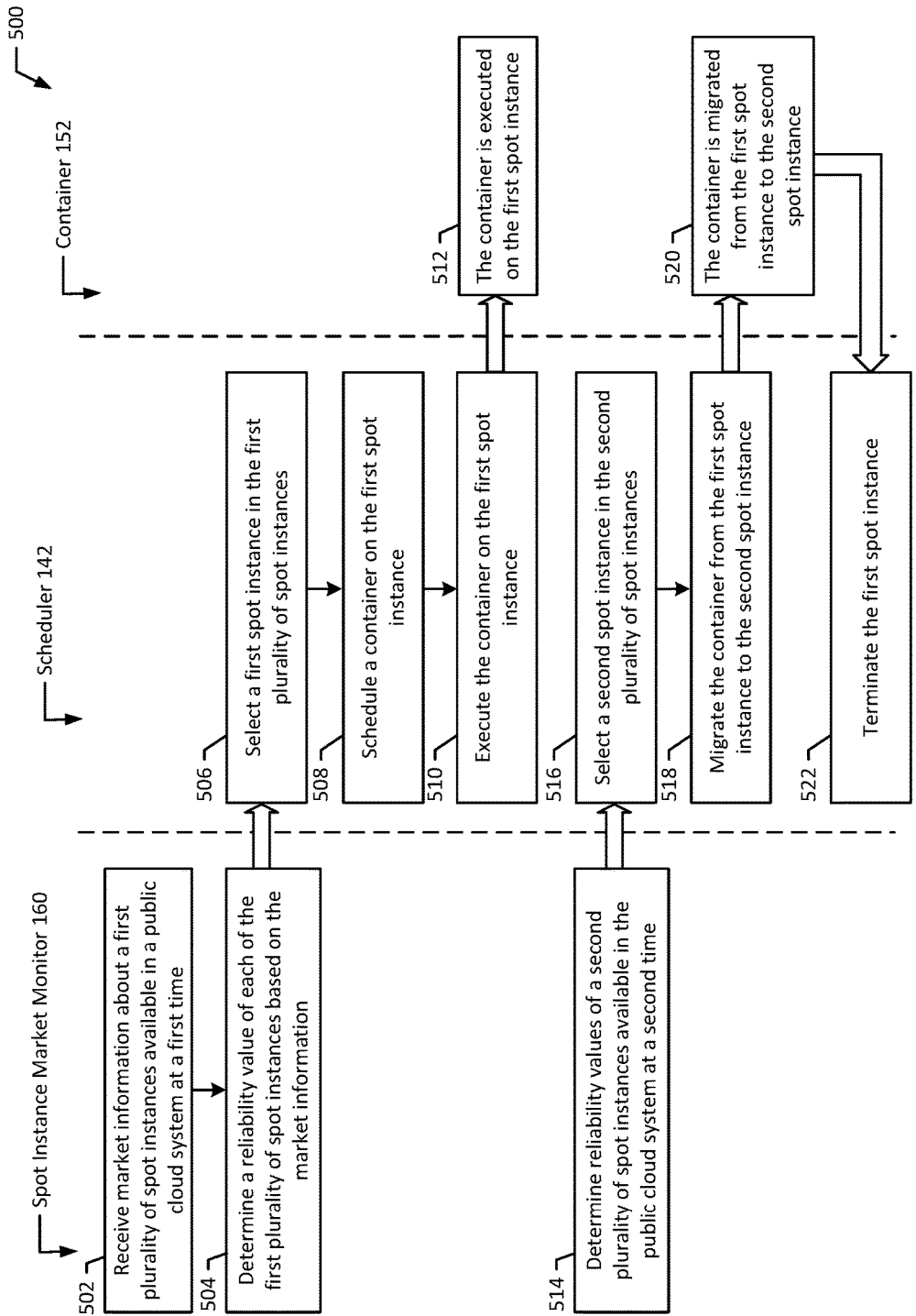
FIGS. 5A, 5B, and 5C are flow diagrams illustrating an example process for providing high availability for a thin-provisioned container cluster according to an example of the present disclosure.
Figure 5B:
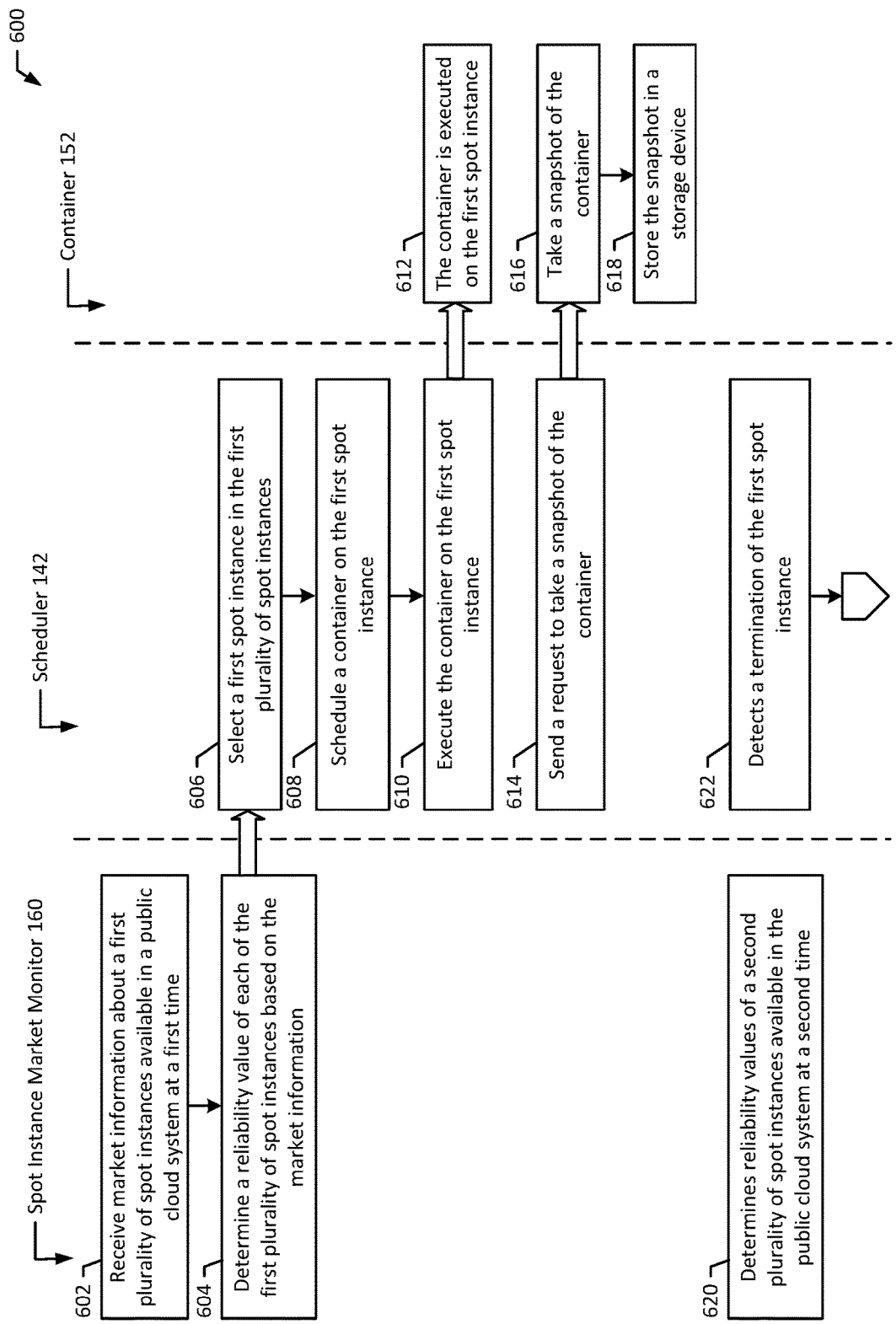
Figure 5C:
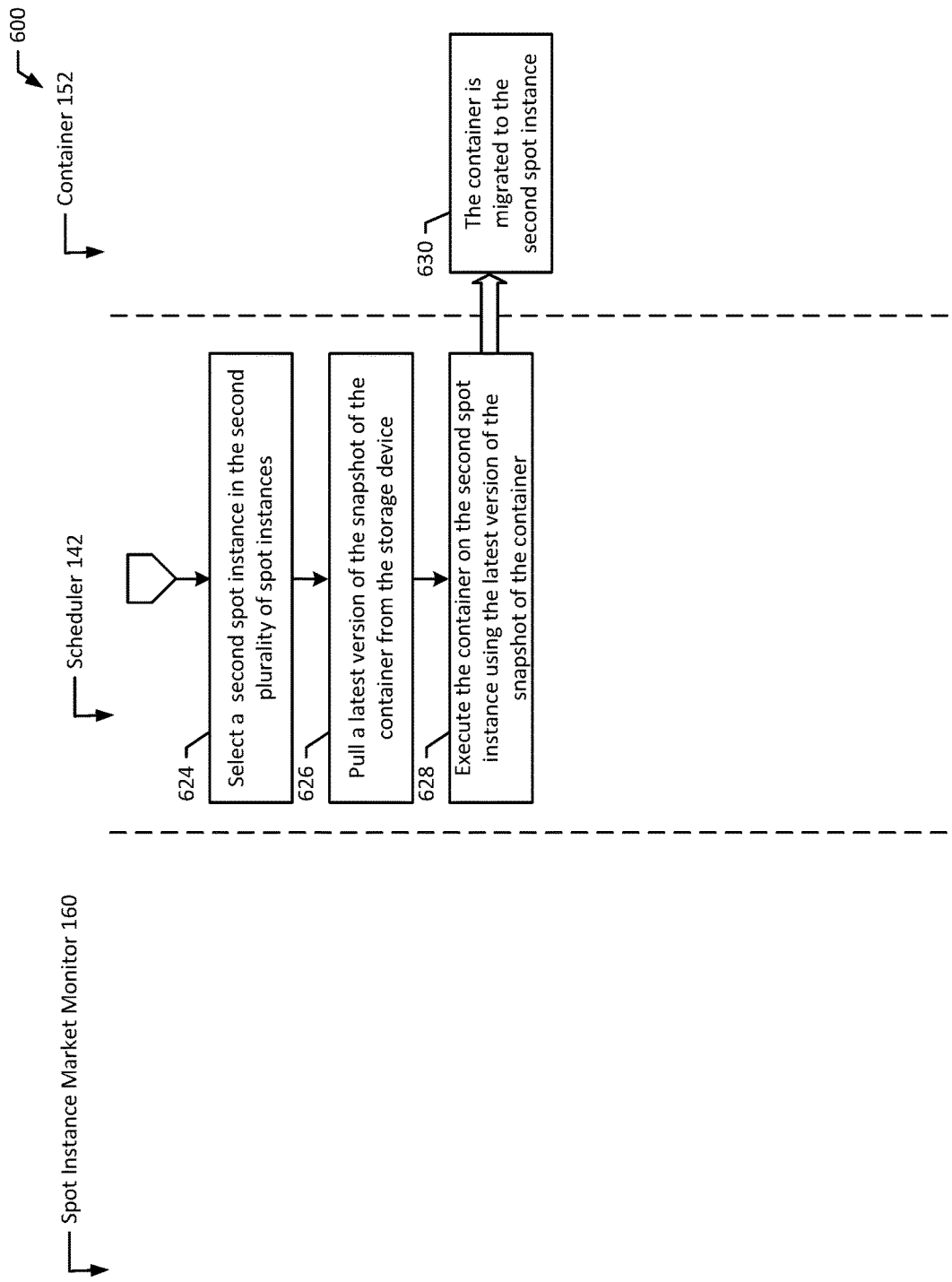

FIGS. 5A, 5B, and 5C illustrate flow diagrams of example methods 500 and 600 for providing high availability for a thin-provisioned container cluster according to an example of the present disclosure. Although the example methods 500 and 600 are described with reference to the flow diagram illustrated in FIGS. 5A, 5B, and 5C, it will be appreciated that many other methods of performing the acts associated with the method may be used. For example, the order of some of the blocks may be changed, certain blocks may be combined with other blocks, and some of the blocks described are optional. The methods 500 and 600 may be performed by processing logic that may include hardware (circuitry, dedicated logic, etc.), software, or a combination of both. For example, the methods 500 and 600 may be performed by a system including a spot instance market monitor 160, a scheduler 142, and a container 152 communicating or interacting with each other.

In the illustrated example, a spot instance market monitor 160 may receive market information about a first plurality of spot instances 320 available in a public cloud system at a first time (block 502). In an example, the spot instance market monitor 160 may receive market information about the spot instances 330A-C available to a client (e.g., purchased by or assigned to the client in any other suitable manner) at a given time among all the spot instances 330A-E in the public cloud system. In another example, the spot instance market monitor 160 may receive market information about all of the spot instances 330A-E existing in the public cloud system at the given time. Then, the spot instance market monitor 160 may determine a reliability value of each of the first plurality of spot instances 320 based on the market information (block 504). In an example, each respective reliability value may correspond to a respective likelihood of a respective spot instance 330A-C being terminated at the first time or at a later time. In an example, the respective reliability value may decrease over time as discussed above.

Then, a scheduler 142 may select a first spot instance 330C in the first plurality of spot instances 320 (block 506). In an example, the scheduler 142 may select the first spot instance 330C in the first plurality of spot instances 320 based on a first reliability value of the first spot instance 330C. For example, the first spot instance 330C may have the greatest reliability value (e.g., 9 which may indicate a likelihood of termination of 10% within one hour) compared to the reliability values of spot stances 330A (e.g., 7) and 330 B (e.g., 5). Then, the scheduler 142 may schedule a container 152 on the first spot instance 330C (block 508). Then, the scheduler 142 may execute the container 152 on the first spot instance 330C (blocks 510 & 512).

At a second time after the first time, the spot instance market monitor 160 may determine reliability values of a second plurality of spot instances 350 available in the public cloud system (block 514). In an example, the spot instance market monitor 160 may receive market information about the spot instances 330C-E or 330A-E at the second time and determine the reliability values based on the market information.

Then, the scheduler 142 may select a second spot instance 330D in the second plurality of spot instances 350 (block 516). In an example, the scheduler 142 may select the second spot instance 330D in the second plurality of spot instances 350 based on a second reliability value of the second spot instance 330D. For example, the second spot instance 330D may be selected because the second spot instance 330D may have the greatest reliability value (e.g., 10 which may indicate a likelihood of termination of 5% or less within one hour) among the second plurality of spot instances 350 (e.g., 330C: 3; 330E: 7) at the second time. In an example, the scheduler 142 or the spot instance market monitor 160 may classify the spot instances available at a given time in a classification, such as a reliable classification and an unreliable classification based on the reliability values (e.g., 0≤reliability value<5: low priority, 5≤reliability value≤10: high priority). In this case, the scheduler 142 may select any spot instance in the reliable classification (e.g., 330D (reliability value: 10) or 330E (reliability value: 7)) at the second time.

Then, the scheduler 142 may migrate the container 152 from the first spot instance 330C to the second spot instance 330D (blocks 518 & 520). Then, the scheduler 142 may terminate the first spot instance 330C after the migration (block 522). In an example, the scheduler 142 may detach the snapshot storage device 205 from the first spot instance 330C and attach the snapshot storage device 205 to the second spot instance 330D during the migration. In an example, the scheduler 142 may migrate the container 152 from the first spot instance 330C to the second spot instance 330D by starting the execution of the container 152 on the second spot instance 330D while the container 152 is executing on the first spot instance 330C and terminating the first spot instance 330C once the second spot instance 330D is fully executing on the second spot instance 330D (e.g., when fully taking over the computing part, fully functional on the second spot instance 330D, and/or the snapshot storage device 205 is attached to the second spot instance 330D).

In an example, the scheduler 142 may start migrating the container 152 from one spot instance to another spot instance at a predetermined timing. In an example, the predetermined timing may be a predetermined time (e.g., 12 hours, 24 hours, 36 hours) after the container 152 started running on one spot instance or after the spot instance, on which the container 152 was running, became available to a client. In another example, the predetermined timing may be a predetermined reliability value (e.g., 5) of the spot instance. For example, when the reliability value of a spot instance, on which the container 152 was running, becomes less than 5, the scheduler 142 may start migrating the container 152 to another spot instance (e.g., to a spot instance having a high reliability value).

Turning to the method 600 shown in FIGS. 5B and 5C, in an example, a spot instance market monitor 160 may receive market information about a first plurality of spot instances 320 available in a public cloud system at a first time (block 602). Then, the spot instance market monitor 160 may determine a reliability value of each of the first plurality of spot instances 320 based on the market information (block 604). Then, a scheduler 142 may select a first spot instance 330C in the first plurality of spot instances 320 (block 606). In an example, the scheduler 142 may select the first spot instance 330C in the first plurality of spot instances 320 based on a first reliability value of the first spot instance 330C. Then, the scheduler 142 may schedule a container 152 on the first spot instance 330C (block 608) and execute the container 152 on the first spot instance 330C (blocks 610 & 612).

In an example, the scheduler 142 may send a request to the container 152 to take a snapshot of the container 152 (block 614). Then, the container 152 may take a snapshot of the container 152 (block 616). In an example, the container 152 may store the snapshot in a storage device (e.g., snapshot storage device 205, a local memory device 130A-C, or any other suitable storage device) (block 618). In an example, the container 152 may take a snapshot of the container 152 periodically (e.g., every second, every 10 seconds, every minute, every 10 minutes, or every hour). In an example, the container 152 may take the snapshot more frequently as the reliability value of the spot instance decreases. For example, the container 152 may take the snapshot every minute in the beginning (e.g., for a couple of hours), every 30 seconds after then (for the next couple of hours), and every second or 0.5 seconds after then (for the next couple of hours before the migration of the container or the termination of the spot instance).

At a second time after the first time, the spot instance market monitor 160 may determine reliability values for a second plurality of spot instances 350 available in the public cloud system (block 620). In an example, the scheduler 142 may detect a termination of the first spot instance 330C (block 622). Then, the scheduler 142 may select a second spot instance 330D in the second plurality of spot instances 350 (block 624). In an example, the scheduler 142 may select the second spot instance 330D in the second plurality of spot instances 350 based on a second reliability value of the second spot instance 330D. For example, the second spot instance 330D may be selected because the second spot instance 330D may have the greatest reliability value (e.g., having a lowest likelihood of termination) among the second plurality of spot instances 350 at the second time. Then, the scheduler 142 may pull a latest version of the snapshot of the container 152, for example, from the storage device 205 (block 626). Then, the scheduler 142 may execute the container 152 on the second spot instance 330D using the latest version of the snapshot of the container 152 (block 628) and the container 152 may be migrated to the second spot instance 330D (block 630). In an example, the scheduler 142 may attach the snapshot storage device 205 to the second spot instance 330D during the migration. In an example, a hybrid cloud system or environment may use spot instances from a public cloud as described herein.

Figure 6:
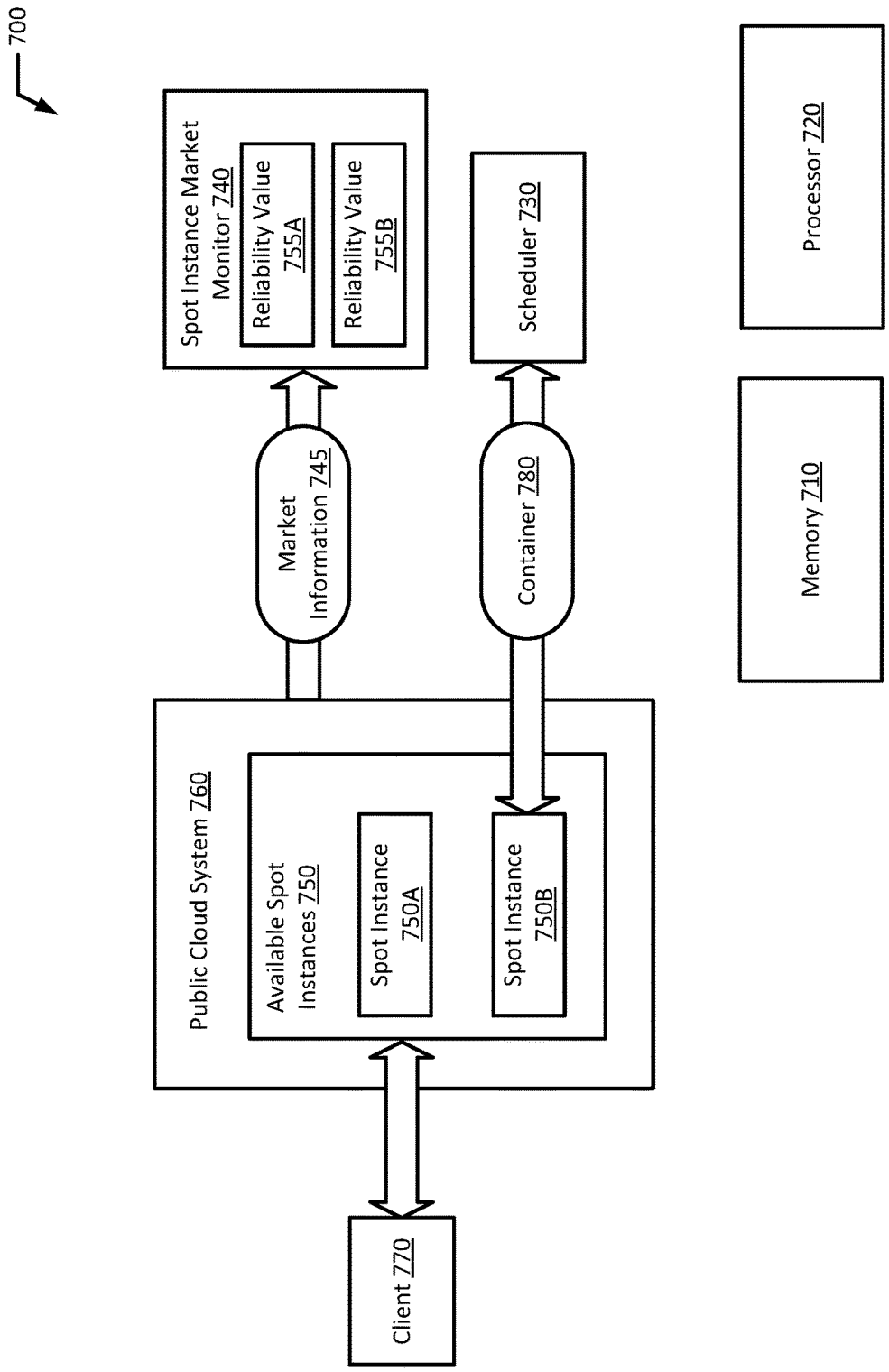
FIG. 6 is a block diagram of an example computer system according to an example of the present disclosure.

FIG. 6 shows a block diagram of an example system according to an example of the present disclosure. As illustrated in FIG. 6, an example system 700 includes a memory 710, a processor 720 in communication with the memory 710, a scheduler 730 executing on the processor 720, and a spot instance market monitor 740. In an example, the spot instance market monitor 740 receives market information 745 about spot instances 750A-B in a cloud system 760 at a first time. The spot instances 750A-B are available to a client 770 at the first time. The spot instance market monitor 740 determines, based on the market information 745, a respective reliability value 755A-B of each of the spot instances 750A-B at the first time. Each respective reliability value 755A-B corresponds to a respective likelihood of a respective spot instance 750A-B being terminated by a second time after the first time. The respective reliability value 755A-B decreases over time. Then, the scheduler 730 selects one spot instance 750B among the spot instances 750A-B based on a reliability value 755B of the spot instance 750B. In response to the selection of the spot instance 750B, the scheduler 730 schedules a container 780 on the spot instance 750B and executes the container 780 on the spot instance 750B.

The systems and methods disclosed herein are inextricably tied to and provide an improvement to computer technology. For example, by using specific rules of executing containers (e.g., executing a container 152 on a reliable spot instance and/or migrating the container 152 to another spot instance either before the termination of the spot instance on which the container 152 was running or after the termination by using the latest version of a snapshot of the container 152), the presently disclosed system may allow a client of a public cloud system to use an unpredictable spot instance with less or no interruptions of service, enabling the use of cost-effective spot instances not only for stateless workloads, but also for stateful workloads. The solution described herein is necessarily rooted in computer technology to overcome a problem specifically arising in the realm of computer networks, and more specifically to cloud computing, by addressing the challenge of scheduling containers on spot instances. For example, a spot instance market monitor 160 may determine, based on market information (e.g., spot instance pricing history), a respective reliability value of each of spot instances 330A-C available to a client, and a container scheduler 142 may select a highly reliable spot instance 330A among the available spot instances 330A-C and schedule a container 152 on the highly reliable spot instance 330A, and may then migrate the container 152 from the spot instance 330A to another then highly reliable spot instance 330B later, either before or after the termination of the spot instance 330A. Thus, the present disclosure provides a particular way to address a problem and improve upon the existing technological processes for scheduling containers in cloud environments, which results in reducing the unpredictability associated with the use of spot instances from the disclosed unconventional manner of scheduling containers using spot instances. The disclosed systems and methods improve the computer hardware to allow for a performance of hardware utilization (e.g., the use of spot instances for both stateless and stateful workloads) not previously performable.

By determining reliability values of spot instances 330A-C, and scheduling containers based on the reliability values, the systems and methods disclosed herein offers the benefit of migrating the container 152 from one spot instance to another spot instance either before the termination of the spot instance on which the container 152 was running or after the termination by using the latest version of a snapshot of the container 152, which is a technology-based solution that overcomes the disadvantages of scheduling containers according to generic and conventional methods. The spot instance market monitor 160 and the scheduler 142 executing on a processor (e.g., CPU 120) acts in concert with containers 152, 157, 162, 167 and hosts 110A-B to provide a non-conventional and non-generic arrangement that improve existing container scheduling techniques to allow a client of a public cloud system to use a spot instance with less or no interruptions of service, thereby improving compute density on the public cloud system and saving a lot of the costs needed for using the public cloud system.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for executing containers, the system comprising:
a memory;
one or more processors in communication with the memory;
a scheduler executing on the one or more processors; and
a spot instance market monitor,
wherein the spot instance market monitor:
receives market information about a first plurality of spot instances in a cloud system at a first time, wherein the first plurality of spot instances are available to a client at the first time; and
determines, based on the market information, a respective reliability value of each of the first plurality of spot instances at the first time, wherein each respective reliability value corresponds to a respective likelihood of a respective spot instance being terminated by a second time after the first time;
wherein the scheduler:
selects a first spot instance in the first plurality of spot instances based on a first reliability value of the first spot instance;
responsive to the selection of the first spot instance, schedules a container on the first spot instance; and
executes the container on the first spot instance.

2. The system of claim 1, wherein the first spot instance has the greatest reliability value among the first plurality of spot instances at the first time.

3. The system of claim 1, wherein the spot instance market monitor determines the respective reliability value of each of the first plurality of spot instances by using an age of each of the first plurality of spot instances.

4. The system of claim 1, wherein the spot instance market monitor determines the respective reliability value of each of the first plurality of spot instances periodically.

5. The system of claim 1, wherein the spot instance market monitor determines a respective reliability value of each of a second plurality of spot instances in the cloud system at a third time after the first time, wherein the second plurality of spot instances are available to the client at the third time.

6. The system of claim 5, wherein the scheduler:
selects a second spot instance in the second plurality of spot instances based on a second reliability value of the second spot instance; and
migrates the container from the first spot instance to the second spot instance.

7. The system of claim 6, wherein the second spot instance has the greatest reliability value among the second plurality of spot instances at the third time.

8. The system of claim 6, wherein the scheduler migrates the container from the first spot instance to the second spot instance by:
starting execution of the container on the second spot instance while the container is executing on the first spot instance; and
terminating the first spot instance once the second spot instance is fully executing on the second spot instance.

9. The system of claim 5, wherein the scheduler sends a request to the container to take a snapshot of the container.

10. The system of claim 9, wherein the container takes the snapshot more frequently as the first reliability value of the first spot instance decreases.

11. The system of claim 9, wherein the scheduler:
detects that the first spot instance is terminated;
responsive to detecting that the first spot instance is terminated, selects a second spot instance in the second plurality of spot instances based on a second reliability value of the second spot instance; and
migrates the container to the second spot instance by:
pulling a latest version of the snapshot of the container; and
starting execution of the container on the second spot instance using the latest version of the snapshot of the container.

12. A method for executing containers, the method comprising:
receiving, by a spot instance market monitor, market information about a first plurality of spot instances in a cloud system at a first time, wherein the first plurality of spot instances are available to a client at the first time;

determining, by the spot instance market monitor, based on the market information, a respective reliability value of each of the first plurality of spot instances at the first time, wherein each respective reliability value corresponds to a likelihood of a respective spot instance being terminated by a second time after the first time;

selecting, by a scheduler executing on one or more processors in communication with a memory, a first spot instance in the first plurality of spot instances based on a first reliability value of the first spot instance;

responsive to the selection of the first spot instance, scheduling, by the scheduler, a container on the first spot instance; and executing, by the scheduler, the container on the first spot instance.

13. The method of claim 12, wherein the first spot instance has the greatest reliability value among the first plurality of spot instances at the first time.

14. The method of claim 12, wherein the spot instance market monitor determines the respective reliability value of each of the first plurality of spot instances by using an age of each of the first plurality of spot instances.

15. The method of claim 12, further comprising determining, by the spot instance market monitor, a respective reliability value of each of a second plurality of spot instances in the cloud system at a third time after the first time, wherein the second plurality of spot instances are available to the client at the third time.

16. The method of claim 15, further comprising:
selecting, by the scheduler, a second spot instance in the second plurality of spot instances based on a second reliability value of the second spot instance;
migrating, by the scheduler, the container from the first spot instance to the second spot instance.

17. The method of claim 16, wherein the scheduler migrates the container from the first spot instance to the second spot instance by:
starting execution of the container on the second spot instance while the container is executing on the first spot instance; and
terminating the first spot instance once the second spot instance is fully executing on the second spot instance.

18. The method of claim 15, further comprising sending, by the scheduler, a request to the container to take a snapshot of the container.

19. The method of claim 18, further comprising:
detecting, by the scheduler, that the first spot instance is terminated;
responsive to detecting that the first spot instance is terminated, selecting, by the scheduler, a second spot instance in the second plurality of spot instances based on a second reliability value of the second spot instance; and
migrating, by the scheduler, the container to the second spot instance by:
pulling a latest version of the snapshot of the container; and
starting execution of the container on the second spot instance using the latest version of the snapshot of the container.

20. A non-transitory machine readable medium storing instructions, which when executed by one or more processors, cause the one or more processors to:
receive, by a spot instance market monitor, market information about a first plurality of spot instances in a cloud system at a first time, wherein the first plurality of spot instances are available to a client at the first time;
determine, by the spot instance market monitor, based on the market information, a respective reliability value of each of the first plurality of spot instances at the first time, wherein each respective reliability value corresponds to a likelihood of a respective spot instance being terminated by a second time after the first time;
select, by a scheduler executing on the one or more processors, a first spot instance in the first plurality of spot instances based on a first reliability value of the first spot instance;
responsive to the selection of the first spot instance, schedule, by the scheduler, a container on the first spot instance; and
execute, by the scheduler, the container on the first spot instance.

* * * * *